(12) United States Patent
Kerr et al.

(10) Patent No.: US 12,037,106 B2
(45) Date of Patent: Jul. 16, 2024

(54) LANDING GEAR SYSTEM CONTROL (71) Applicant: AIRBUS OPERATIONS LIMITED, Bristol (GB)

(72) Inventors: Sean Kerr, Bristol (GB); Martin Downey, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 993 days.

(21) Appl. No.: 16/976,612

(22) PCT Filed: Feb. 27, 2019

(86) PCT No.: PCT/EP2019/054796
§ 371 (c)(1),
(2) Date: Aug. 28, 2020

(87) PCT Pub. No.: WO2019/166461
PCT Pub. Date: Sep. 6, 2019

(65) Prior Publication Data
US 2020/0407047 A1    Dec. 31, 2020

(30) Foreign Application Priority Data

Feb. 28, 2018 (GB) .................................. 1803271

(51) Int. Cl.
| | |
|---|---|
| *B64C 25/00* | (2006.01) |
| *B64C 1/14* | (2006.01) |
| *B64C 9/00* | (2006.01) |
| *B64C 13/24* | (2006.01) |
| *B64C 25/26* | (2006.01) |
| *E05F 15/70* | (2015.01) |

(52) U.S. Cl.
CPC ............ *B64C 25/26* (2013.01); *B64C 1/1407* (2013.01); *B64C 9/00* (2013.01); *B64C 13/24* (2013.01); *E05F 15/70* (2015.01); *E05Y 2400/10* (2013.01); *E05Y 2900/502* (2013.01)

(58) Field of Classification Search
CPC ......... B64C 25/26; B64C 1/1407; B64C 9/00; B64C 13/24; E05F 15/70; E05Y 2400/10; E05Y 2900/502
USPC ........................................................ 701/3
See application file for complete search history.

(56) References Cited

U.S. PATENT DOCUMENTS 2,506,178 A * 5/1950 Shaw .................... B64C 25/505
244/50
2,580,452 A    1/1952 Miller
(Continued)

FOREIGN PATENT DOCUMENTS

| | | |
|---|---|---|
| EP | 2 860 602 | 4/2015 |
| EP | 3 339 167 | 6/2018 |
| WO | 2005/077757 | 8/2005 |

OTHER PUBLICATIONS

International Search Report and Written Opinion of the ISA for PCT/EP2019/054796 dated Jun. 25, 2019, 17 pages.

*Primary Examiner* — Tiffany P Young
(74) *Attorney, Agent, or Firm* — Nixon & Vanderhye P.C.

(57) ABSTRACT

A landing gear system controller for controlling a landing gear system of an aircraft. The controller is configured to receive a request to operate a non-landing gear system element of the aircraft, and to cause operation of at least part of the landing gear system of the aircraft during a take-off or landing procedure on the basis of the request.

16 Claims, 3 Drawing Sheets

(56) References Cited

U.S. PATENT DOCUMENTS

| | | | |
|---|---|---|---|
| 2009/0082913 A1* | 3/2009 | Yount | B64D 45/0031 |
| | | | 307/64 |
| 2013/0026299 A1* | 1/2013 | Constans | G05D 1/0676 |
| | | | 244/202 |
| 2015/0122945 A1 | 5/2015 | Kavounas | |
| 2015/0144735 A1* | 5/2015 | Lecourtier | B64C 25/16 |
| | | | 244/102 R |
| 2017/0249852 A1 | 8/2017 | Haskins et al. | |

* cited by examiner

LANDING GEAR SYSTEM CONTROL

RELATED APPLICATIONS

This application is the U.S. national phase of International Application PCT/EP2019/054796 filed Feb. 27, 2019, which designated the U.S. and claims priority to United Kingdom Patent Application GB 1803271.4 filed Feb. 28, 2018, the entire contents of each of which are hereby incorporated by reference.

TECHNICAL FIELD

The present invention relates to control of landing gears systems of aircraft, and particularly to landing gear system controllers for controlling landing gear systems of aircraft and to methods of controlling landing gear systems of aircraft.

BACKGROUND

In some known aircraft, a landing gear is held in an extended position when the aircraft is on the ground and is retracted to a stowed position in a landing gear bay once the aircraft has taken off. Such stowage of the landing gear helps to reduce aircraft drag and noise and the risk of the landing gear being damaged in flight. The landing gear subsequently is extended to the extended position again before the aircraft lands. A landing gear bay door may at least partially cover the landing gear bay when closed, and may be openable to enable movement of the landing gear between the stowed position and the extended position. Movement of the landing gear and the landing gear bay door is typically controlled by a pilot using cockpit flight controls of the aircraft, such as a landing gear control lever.

SUMMARY

A first aspect of the present invention provides a landing gear system controller for controlling a landing gear system of an aircraft, wherein the controller is configured: to receive a request to operate a non-landing gear system element of the aircraft; and to cause operation of at least part of the landing gear system of the aircraft during a take-off or landing procedure on the basis of the request.

Optionally, the controller is configured to perform a determination on the basis of the request as to whether to cause the operation, and to cause the operation on the basis of a result of the determination.

Optionally, the request is generated by a pilot of the aircraft manually operating an input device. Optionally, the input device is a cockpit flight control, such as a control yoke or a control to engage an automatic landing system.

Optionally, the request comprises a request to operate a main control surface of the aircraft to cause rotation of the aircraft during a take-off procedure.

Optionally, the request comprises a request to engage an automatic landing system.

Optionally, the controller is configured to cause operation of the non-landing gear system element of the aircraft on the basis of the request.

Optionally, the controller is configured to cause operation of a secondary control surface actuator of the aircraft to drive movement of a secondary control surface of the aircraft, on the basis of the request.

A second aspect of the present invention provides an aircraft system, comprising: a landing gear system; and a landing gear system controller that is operatively connected to the landing gear system; wherein the controller is configured to receive a request to operate a non-landing gear system element of an aircraft, and to cause operation of at least part of the landing gear system during a take-off or landing procedure on the basis of the request.

Optionally, the controller is configured to cause the operation of at least part of the landing gear system on the basis of the request and in dependence on a determination that at least one predetermined condition is true.

Optionally, the at least one predetermined condition is/are selected from the group consisting of: that a predetermined period has elapsed since the controller received the request, that the request meets a predetermined criterion, that the aircraft has rotated, that the aircraft is off the ground, that the aircraft is achieving a positive rate of climb, that the aircraft is travelling at greater than a predetermined speed, that the aircraft is at greater than a predetermined height above the ground, that the aircraft is travelling at less than a predetermined speed, and that the aircraft is at less than a predetermined height above the ground.

Optionally, the landing gear system comprises a landing gear that is moveable between an extended position and a retracted position, and a landing gear actuator for driving movement of the landing gear between the extended position and the retracted position; and the at least part of the landing gear system comprises the landing gear actuator to drive movement of the landing gear between the extended position and the retracted position.

Optionally, the landing gear system comprises: a landing gear that is moveable between an extended position and a retracted position and the landing gear is at least partially stowed in a landing gear bay when the landing gear is at the retracted position, a landing gear bay door that is movable between a closed position and an open position and the landing gear bay door at least partially covers the landing gear bay when the landing gear bay door is at the closed position, and a landing gear bay door actuator for driving movement of the landing gear bay door between the closed position and the open position; and the at least part of the landing gear system comprises the landing gear bay door actuator to drive movement of the landing gear bay door between the closed position and the open position.

Optionally, the aircraft system comprises a secondary control surface and a secondary control surface actuator for driving movement of the secondary control surface; and the controller is configured to cause operation of the secondary control surface actuator to drive movement of the secondary control surface on the basis of the request. Optionally, the secondary control surface comprises a flap or a slat.

Optionally, the controller is configured to determine a status of the landing gear system, and to cause the operation of the secondary control surface actuator to drive movement of the secondary control surface on the basis of the request and in dependence on the status determined. Optionally, the status of the landing gear system comprises a degree of extension or retraction of a landing gear of the landing gear system.

Optionally, the controller is configured to cause operation of the non-landing gear system element of the aircraft on the basis of the request. Optionally, the aircraft system comprises the non-landing gear system element, and the controller is configured to cause operation of the non-landing gear system element on the basis of the request.

Optionally, the non-landing gear system element is selected from the group consisting of: a main control surface, an aileron, an elevator, a rudder, a secondary control surface, a flap, a slat, a taileron, a ruddervator, a flaperon, an elevon, a spoileron, a canard, a canardvator, a roll spoiler, a ground spoiler, a thrust generator, an automatic landing system, and an automatic braking system.

Optionally, the aircraft system comprises an input device that is operatively connected to the landing gear system controller, and the input device is manually operable by a pilot of the aircraft to generate the request. Optionally, the input device is a cockpit flight control, such as a control yoke or a control to engage an automatic landing system.

A third aspect of the present invention provides a method of controlling a landing gear system of an aircraft during take-off or landing of the aircraft, the method comprising: receiving a request to operate a non-landing gear system element of the aircraft, and causing operation of at least part of the landing gear system of the aircraft during a take-off or landing procedure on the basis of the request.

Optionally, the method comprises performing a determination as to whether to cause the operation on the basis of the request, and causing the operation on the basis of a result of the determination.

Optionally, the request is electrical or electronic. Optionally, the request is other than electrical or electronic, such as mechanical or hydraulic.

Optionally, the request is generated as a result of manual operation of an input device by a pilot of the aircraft. Optionally, the input device is a cockpit flight control, such as a control yoke or a control to command engagement of an automatic landing system.

Optionally, the request is to operate a main control surface of the aircraft. Optionally, the request is to operate a main control surface of the aircraft to cause rotation of the aircraft during a take-off procedure.

Optionally, the request comprises a request to commence an automatic aircraft landing procedure.

Optionally, the at least part of the landing gear system comprises one or more of: a landing gear bay door lock, a landing gear bay door actuator, a landing gear lock, and a landing gear actuator.

Optionally, the method comprises causing operation of a secondary control surface actuator of the aircraft to drive movement of a secondary control surface of the aircraft on the basis of the request. Optionally, the secondary control surface comprises a flap or a slat.

Optionally, the causing operation of the secondary control surface actuator is in dependence on a status of the landing gear system. Optionally, the status of the landing gear system comprises a degree of extension or retraction of a landing gear of the landing gear system.

Optionally, the method comprises causing operation of the non-landing gear system element of the aircraft on the basis of the request. Optionally, the non-landing gear system element of the aircraft is selected from the group consisting of: a main control surface, an aileron, an elevator, a rudder, a secondary control surface, a flap, a slat, a thrust generator, and an automatic landing system.

Optionally, the causing operation of at least part of the landing gear system is on the basis of the request and in dependence on a determination that at least one predetermined condition is true. Optionally, the at least one predetermined condition is/are selected from the group consisting of: that a predetermined period has elapsed since the controller received the request, that the request meets a predetermined criterion, that the aircraft has rotated, that the aircraft is off the ground, that the aircraft is achieving a positive rate of climb, that the aircraft is travelling at greater than a predetermined speed, that the aircraft is at greater than a predetermined height above the ground, that the aircraft is travelling at less than a predetermined speed, and that the aircraft is at less than a predetermined height above the ground.

A fourth aspect of the present invention provides a non-transitory computer-readable storage medium storing instructions that, if executed by a processor of a landing gear system controller, cause the processor to carry out the method of the third aspect of the invention.

A fifth aspect of the present invention provides an aircraft landing gear system controller, wherein the controller is configured to initiate operation of an element of a landing gear system of an aircraft and an element of a non-landing gear system of the aircraft during take-off or landing of the aircraft, in response to receiving a signal indicative of operation of a cockpit flight control to request operation of the element of the non-landing gear system.

A sixth aspect of the present invention provides an aircraft, comprising: the controller of the first aspect of the present invention or of the fifth aspect of the present invention; the aircraft system of the second aspect of the present invention; and/or the non-transitory computer-readable storage medium of the fourth aspect of the present invention.

BRIEF DESCRIPTION OF THE DRAWINGS

Embodiments of the present invention will now be described, by way of example only, with reference to the accompanying drawings, in which.

DETAILED DESCRIPTION

An aircraft landing gear system can influence aircraft performance. In the extended position, the landing gear may increase aircraft drag, which can reduce the climb rate of the aircraft during take-off, and may increase aircraft noise, which can be disturbing to people on the ground in the vicinity of the aircraft. Similar effects can result from a landing gear bay door of the system being in an open position.

Enabling landing gear refraction and bay door closure to occur sooner after take-off can therefore help to reduce aircraft drag, which may enable an increased aircraft climb rate to help avoid obstacles on the ground, and may allow an increase in maximum take-off weight of the aircraft for a given size of landing gear system, wing capability and engine thrust. Similarly, enabling landing gear extension and bay door opening to occur later in a landing procedure can help to reduce the total aircraft noise caused during a landing procedure, or at least reduce a period of time during which the aircraft is making increased noise due to extended landing gear. Decreasing the time for which the landing gear is extended and the landing gear bay door is open can also reduce the risk of the landing gear or the landing gear bay door being damaged, such as by buffeting by wind.

Typically, movement of landing gear and landing gear bay doors is initiated by a pilot manually operating cockpit flight controls, such as a landing gear control lever. Operation of the cockpit flight controls causes a landing gear bay door actuator to drive movement of the landing gear bay door between a closed position and an open position, a landing gear actuator to extend or retract the landing gear, and the landing gear bay door actuator to thereafter drive movement of the landing gear bay door between the open position and the closed position. During a take-off procedure, the pilot will typically manually initiate a landing gear retraction procedure upon confirming, for example, a positive rate of aircraft climb. This may be at about three seconds after take-off. During a landing procedure, the pilot will typically manually initiate a landing gear extension procedure upon confirming, for example, that the aircraft is travelling at less than a predetermined speed. Since take-off and landing procedures are the highest workload flight phases for flight crew, there is a tendency for retraction of landing gear to be delayed after take-off and for extension of landing gear to be performed early in the approach during landing, in order to spread the various actions that the flight crew must perform during landing or take-off over a greater period of time.

Some embodiments of the present invention are concerned with enabling landing gear retraction to occur sooner after take-off or enabling landing gear extension to occur later in a landing procedure, while reducing or not adding to the overall workload of the flight crew. This is achieved in some embodiments by causing some or all of a landing gear extension or retraction process to be performed, e.g. automatically, on the basis a request to operate an element of a non-landing gear system.

Figure 1:
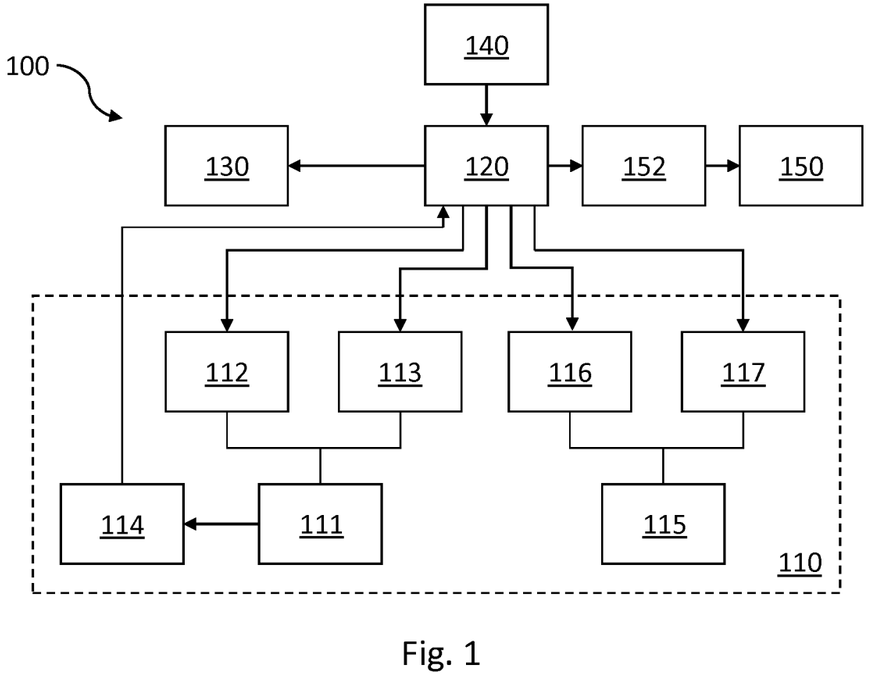
FIG. 1 is a schematic view of an example of an aircraft system according to an embodiment of the present invention.

FIG. 1 shows a schematic view of an example of an aircraft system 100 according to an embodiment of the present invention. The aircraft system 100 comprises a landing gear system 110 and a landing gear system controller 120 that is operatively connected to the landing gear system 110. This connection may be a wired connection or a wireless connection, for example. The controller 120 is configured to receive a request to operate a non-landing gear system element 130 of an aircraft, and to cause or initiate operation of at least part of the landing gear system 110 during a take-off or landing procedure on the basis of the request. In some embodiments, the controller 120 is configured to initiate operation of an element of the landing gear system 110 and the element 130 of the non-landing gear system during take-off or landing of the aircraft, in response to receiving a signal indicative of operation of a cockpit flight control to request operation of the element 130 of the non-landing gear system.

In this embodiment, the landing gear system 110 comprises a landing gear 111, a landing gear actuator 112, a landing gear lock 113, a landing gear bay door 115, a landing gear bay door actuator 116, and a landing gear bay door lock 117. However, in some embodiments, one or more of these parts or elements of the landing gear system 110 may be omitted. For example, in some embodiments, the landing gear system 110 may be free from a landing gear bay door 115, a landing gear bay door actuator 116, and a landing gear bay door lock 117.

The landing gear 111 is moveable between an extended position and a refracted position, the landing gear actuator 112 is for driving movement of the landing gear 111 between the extended position and the retracted position, and the landing gear lock 113 is for retaining the landing gear 111 in position when retracted or extended. The landing gear actuator 112 may take any suitable form, such as a hydraulic actuator or an electro-hydraulic actuator. Similarly, the landing gear lock 113 may take any suitable form, such as a hydraulically-actuated lock or an electro-hydraulically-actuated lock.

When the landing gear 111 is at the retracted position, it is at least partially stowed in a landing gear bay (not shown). The landing gear bay door 115 is associated with the landing gear 111 and the landing gear bay. The landing gear bay door 115 is movable between an open position and a closed position and, when at the closed position, the landing gear bay door 115 at least partially covers the landing gear bay. This way, the landing gear bay door 115 helps to protect the landing gear bay, and the landing gear 111 when stowed in the bay, from debris that might be thrown towards the bay while the aircraft is moving on the ground or in flight. The landing gear bay door actuator 116 is for driving movement of the landing gear bay door 115 between the open position and the closed position. The landing gear bay door lock 117 is for retaining the landing gear bay door 115 in the closed position. The landing gear bay door actuator 116 may take any suitable form, such as a hydraulic actuator or an electro-hydraulic actuator. Similarly, the landing gear bay door lock 117 may take any suitable form, such as a hydraulically-actuated lock or an electro-hydraulically-actuated lock. Further discussion of the landing gear system and control of at least a part thereof is provided below.

In some embodiments, such as that shown in FIG. 1, the request received by the controller 120 may be generated by a pilot of the aircraft manually operating an input device 140, such as a cockpit flight control. Indeed, in this embodiment, the aircraft system 100 comprises such an input device 140. The input device 140 is operatively connected to the controller 120 and is manually operable by a pilot of the aircraft to generate the request. In some embodiments, the controller 120 receives a signal indicative of operation of the cockpit flight control to request operation of the element 130 of the non-landing gear system.

The request may comprise a request to operate a main control surface (also known as a "main flight control surface") 130 of the aircraft, such as to cause rotation of the aircraft during a take-off procedure. An example such main control surface is an elevator. In such cases, the input device 140 may comprise a control yoke, and the request or signal may be generated by the pilot manually operating the control yoke, such as by pulling on the control yoke.

Alternatively, the request may comprise a request to engage an automatic landing system (also known as "autoland") 130. As will be appreciated by the skilled reader, an automatic landing system is a system that may partially or fully automate the landing procedure of an aircraft's flight, with the flight crew supervising the process. Such systems enable aircraft to land in weather conditions that would otherwise be dangerous or potentially impossible to operate in. In such cases, the input device 140 may comprise a button, dial, knob, switch or other cockpit flight control associated with the automatic landing system, and the request or signal may be generated by the pilot manually operating the input device 140.

In other embodiments, the non-landing gear system element 130 of the aircraft may be other than a main control surface or an automatic landing system, such as a secondary control surface (also known as a "secondary flight control surface") of the aircraft, a ground spoiler, an automatic braking system (also known as "autobrake"), or a thrust generator.

In some embodiments, the controller 120 is configured to perform a determination on the basis of the request as to whether to cause or initiate the operation of at least part of the landing gear system 110, and to cause or initiate the operation of at least part of the landing gear system 110 on the basis of a result of the determination. The determination may comprise determining whether causing the operation would aid achievement of an underlying (known or predicted) aim of the request. For example, if the request comprises a request to operate a main control surface 130 of the aircraft to cause rotation of the aircraft during a take-off procedure, then the controller 120 may determine whether causing the operation would help to achieve rotation of the aircraft during the take-off procedure. In making this determination, the controller 120 may determine (e.g. receive or calculate) and consider one or more other factors, such as aircraft speed, aircraft inclination, aircraft climb rate, aircraft height above the ground, and the like. If the controller 120 determines in the circumstances that causing the operation would help achieve the underlying aim of the request, then the controller 120 causes the operation. In other embodiments, the controller 120 may not be configured to perform such a determination.

In some embodiments, the controller 120 may be configured to cause or initiate operation of the non-landing gear system element 130 of the aircraft on the basis of the request. That is, the controller 120 may be configured to cause operation of the at least part of the landing gear system 110 and to cause operation of the element 130 of the non-landing gear system of the aircraft, on the basis of the request. Indeed, in this embodiment, the aircraft system 100 comprises such a non-landing gear system element 130 of the aircraft. The non-landing gear system element 130 may, for example, be selected from the group consisting of: a main control surface, an aileron, an elevator, a rudder, a secondary control surface, a flap, a slat, a taileron, a ruddervator, a flaperon, an elevon, a spoileron, a canard, a canardvator, a roll spoiler, a ground spoiler, a thrust generator, an automatic landing system, and an automatic braking system. Examples of a main control surface are an aileron, an elevator, and a rudder, as would be understood by the skilled reader. Examples of a secondary control surface are a flap and a slat, as would also be understood by the skilled reader. An example thrust generator is an aircraft engine, such as a gas turbine, an electric motor or a piston engine.

Alternatively, in some embodiments, the controller 120 is not configured to cause or initiate operation of the non-landing gear system element 130. For example, in some embodiments both the controller 120 and a second controller (not shown) may receive the request, and the second controller is configured to cause operation of the non-landing gear system element 130.

As mentioned above, the controller 120 is configured to cause or initiate the operation of at least part of (or an element of) the landing gear system 110 on the basis of the request. In some embodiments, the at least part of the landing gear system 110 comprises the landing gear bay door lock 117 to unlock the landing gear bay door 115. In some embodiments, the at least part of the landing gear system 110 comprises the landing gear bay door actuator 116 to positively hold the landing gear bay door 115 in a closed position, and the landing gear bay door lock 117 to unlock the landing gear bay door 115 to permit subsequent movement of the landing gear bay door 115 towards the open position. In some embodiments, the at least part of the landing gear system 110 comprises the landing gear bay door actuator 116 to drive movement of the landing gear bay door 115 between the closed position and the open position. The movement may, for example, be from the closed position towards the open position, such as before the landing gear 111 is extended or retracted as part of the process. Alternatively or additionally, the movement may be from the open position towards the closed position, such as after the landing gear 111 has been extended or retracted as part of the process.

Accordingly, since some of a landing gear refraction or extension process is performed on the basis of the request, the rest of the process (comprising retraction or extension of the landing gear 111) may be able to occur more quickly subsequently, such as in response to a pilot request to perform the rest of the process, since fewer actions of the process remain to be completed. This can lead to one or more of the advantages discussed above. Moreover, since no separate command independent of the request need be made to cause the portion of the process to be performed, there is no additional burden on the flight crew.

In some embodiments, the at least part of the landing gear system 110 comprises the landing gear actuator 112 to drive movement of the landing gear 111 between the extended position and the retracted position. The movement may, for example, be from the extended position towards the retracted position during a take-off procedure, or from the retracted position towards the extended position during a landing procedure. In some embodiments, the at least part of the landing gear system 110 comprises the landing gear lock 113, to unlock the landing gear 111 prior to extension or refraction and/or to lock the landing gear 111 in position after extension or retraction.

Accordingly, during a take-off procedure, retraction of the landing gear 111 may be achievable sooner than if the pilot instead had to separately manually request landing gear retraction upon confirming, for example, a positive rate of aircraft climb. Similarly, during a landing procedure, extension of the landing gear 111 may be achievable later in the approach, such as when an automatic landing system is engaged, since doing so does not add to the actions that the flight crew must perform at this later stage. Again, this can lead to one or more of the advantages discussed above.

In some embodiments, the controller 120 may be configured to cause operation of the plural parts of the landing gear system 110 on the basis of the request. For example, on the basis of the request, the controller 120 may be configured to cause operation of: (i) the landing gear bay door actuator 116 to positively hold the landing gear bay door 115 in a closed position, (ii) the landing gear bay door lock 117 to unlock the landing gear bay door 115, (iii) the landing gear bay door actuator 116 to then drive movement of the landing gear bay door 115 from the closed position towards the open position, (iv) the landing gear lock 113 to unlock the landing gear 111, (v) the landing gear actuator 112 to then drive movement of the landing gear 111 between the extended position and the retracted position, (vi) the landing gear lock 113 to then lock the landing gear 111, (vii) the landing gear bay door actuator 116 to then drive movement of the landing gear bay door 115 from the open position towards the closed position, and/or (viii) the landing gear bay door lock 117 to then lock the landing gear bay door 115 in the closed position.

In some embodiments, the controller 120 is configured to cause or initiate the operation of the at least part of the landing gear system 110 on the basis of the request as well as in dependence on a determination that at least one predetermined condition is true. That is, in such embodiments, it is necessary that an additional criterion has been met or additional criteria have been met, in order for the controller 120 to cause the operation of the at least part of the landing gear system 110 on the basis of the request. The controller 120 may be configured to make this determination, such as on the basis of one or more suitable inputs to the controller 120 from external apparatus(es) configured to detect or measure whether the predetermined condition(s) is/are true.

For example, the at least one predetermined condition may be selected from the group consisting of: (a) that a predetermined period has elapsed since the controller 120 received the request, (b) that the request meets a predetermined criterion, (c) that the aircraft has rotated, (d) that the aircraft is off the ground, (e) that the aircraft is achieving a positive rate of climb, (f) that the aircraft is travelling at greater than a predetermined speed, (g) that the aircraft is at greater than a predetermined height above the ground, (h) that the aircraft is travelling at less than a predetermined speed, and (i) that the aircraft is at less than a predetermined height above the ground. Example apparatuses configured to detect or measure whether the predetermined condition(s) is/are true are a timer (such as in the controller 120 or external thereto), an accelerometer, an inclinometer, a distance measurer, an altimeter, a weight-on-wheels sensor (or weight-on-landing-gear sensor), an air speed sensor, a ground speed sensor, and a global positioning system.

In some embodiments, the controller 120 is configured to cause the operation of at least part of the landing gear system 110 during a take-off procedure on the basis of the request and one or more of conditions (a), (b), (c), (d), (e), (f) and (g). In some embodiments, the controller 120 is configured to cause the operation of at least part of the landing gear system 110 during a landing procedure on the basis of the request and one or more of conditions (a), (b), (h) and (i). It will be appreciated that the consideration of the one or more of these conditions may reduce the risk of damage to the landing gear system or other parts of the aircraft, such as due to premature retraction or extension of the landing gear 111. For example, implementing a time delay (example condition (a)) between receipt of the request and causation of operation of the at least part of the landing gear system 110 may be beneficial when the operation of the at least part of the landing gear system 110 is not to occur at the same time as the operation requested.

However, in other embodiments, the controller 120 may be configured to cause or initiate the operation of at least part of the landing gear system 110 on the basis of the request and without dependence on a determination that at least one predetermined condition is true.

Generally speaking, the more extended a landing gear 111 is, the more drag it creates during movement of the aircraft. One or more flaps or slats on a wing can be suitably positioned to mitigate, at least partially, the drag created by a landing gear 111. This is because extending a flap and/or a slat can increase the maximum lift coefficient of the aircraft.

In some embodiments, the controller 120 is configured to cause operation of a secondary control surface actuator 152 of the aircraft to drive movement of a secondary control surface 150 of the aircraft, on the basis of the request. That is, the controller 120 may be configured to cause operation of the at least part of the landing gear system 110 and to cause operation of the secondary control surface actuator 152 of the aircraft, on the basis of the request. Indeed, in this embodiment, the aircraft system 100 comprises such a secondary control surface 150 and a secondary control surface actuator 152 for driving movement of the secondary control surface 150. The secondary control surface 150 may, for example, be a flap or a slat. In some embodiments, on the basis of the request, the controller 120 may be configured to cause operation of (a) the at least part of the landing gear system 110, (b) the secondary control surface actuator 152, and (c) the element 130 of the non-landing gear system of the aircraft. The non-landing gear system element 130 may be any such element discussed above.

The controller 120 may be configured to determine a status of the landing gear system 110, and to cause the operation of the secondary control surface actuator 152 to drive movement of the secondary control surface 150 on the basis of the request and in dependence on the landing gear system status determined. The controller 120 may be configured to make this determination, such as on the basis of an input to the controller 120 from a sensor 114 of the landing gear system 110. The sensor 114 may be configured to detect the status of the landing gear system 110. The status of the landing gear system 110 may comprise a degree of extension or retraction of the landing gear 111.

So, for example, during a take-off procedure, the controller 120 may be configured to determine a degree of extension or retraction of the landing gear 111 (optionally repeatedly during the landing gear retraction), and to cause the operation of the secondary control surface actuator 152 to drive retraction of the secondary control surface 150 as the drag caused by the landing gear 111 reduces, thereby to help "clean-up" the surface of the aircraft. Alternatively, during a landing procedure, the controller 120 may be configured to determine a degree of extension or retraction of the landing gear 111 (optionally repeatedly during the landing gear extension), and to cause the operation of the secondary control surface actuator 152 to drive extension of the secondary control surface 150 as the drag caused by the landing gear 111 increases, thereby to increase the lift coefficient of the aircraft.

Alternatively, in some embodiments, the controller 120 is not configured to determine a status of the landing gear system 110 and/or is not configured to cause operation of a secondary control surface actuator 152.

In the embodiment shown in FIG. 1 and discussed above, the aircraft system 100 comprises the non-landing gear system element 130. However, in other embodiments, the non-landing gear system element 130 may be external to the aircraft system 100 and the aircraft system 100 may be free from a non-landing gear system element. Nevertheless, the controller 120 may still be configured to cause or initiate operation of the non-landing gear system element 130 on the basis of the request, in use. Such configuration of the controller 120 may comprise the controller 120 having a suitable interface via which the controller 120 is able to communicate with the non-landing gear system element 130 in use.

In the embodiment shown in FIG. 1 and discussed above, the aircraft system 100 comprises the input device 140. However, in other embodiments, the aircraft system 100 may be free from an input device 140. For example, the input device 140 may be external to the aircraft system 100. However, the controller 120 may still be configured to receive a request from such an input device 140, in use. Such configuration of the controller 120 may comprise the controller 120 having a suitable interface via which such a request is receivable or via which the controller 120 is able to communicate with the input device 140 and/or the controller 120 having suitable architecture to recognise the request in use. In other embodiments, the controller 120 may be for receiving a request from other than an input device 140, such as from another system of an aircraft.

In the embodiment shown in FIG. 1 and discussed above, the aircraft system 100 comprises the secondary control surface 150 and associated secondary control surface actuator 152. However, in other embodiments, the aircraft system 100 may be free from these elements 150, 152. For example, these elements 150, 152 may be external to the aircraft system 100. However, the controller 120 may still be configured to cause operation of a secondary control surface actuator 152 to drive movement of a secondary control surface 150 of the aircraft on the basis of the request, in use. Such configuration of the controller 120 may comprise the controller 120 having a suitable interface via which the controller 120 is able to communicate with the secondary control surface actuator 152 in use.

In some embodiments, the landing gear system controller 120 may be provided separately from the landing gear system 110, such as in isolation. However, the controller 120 may still itself be configured to cause or initiate operation of at least part of a landing gear system 110 of an aircraft during a take-off or landing procedure on the basis of a request to operate a non-landing gear system element of the aircraft, in use. Again, such configuration of the controller 120 may comprise the controller 120 having a suitable interface via which the controller 120 is able to communicate with the landing gear system 110 in use.

The present invention also provides a method of controlling a landing gear system of an aircraft during take-off or landing of the aircraft.

Figure 2:
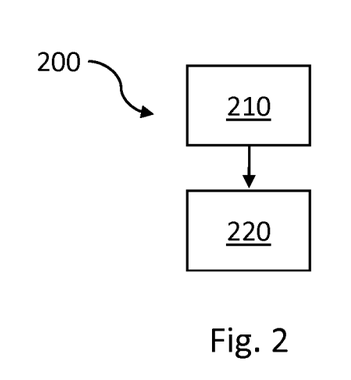
FIG. 2 is a flow diagram showing an example of a method according an embodiment of the present invention.

FIG. 2 is a flow diagram showing an example of a method according an embodiment of the present invention. The method 200 of this embodiment comprises receiving 210 a request to operate a non-landing gear system element of the aircraft, and causing or initiating 220 operation of at least part of the landing gear system of the aircraft during a take-off or landing procedure on the basis of the request. The method 200 may be performed by a landing gear system controller 120, such as the landing gear system controller 120 of any one of the embodiments discussed herein.

Figure 3:
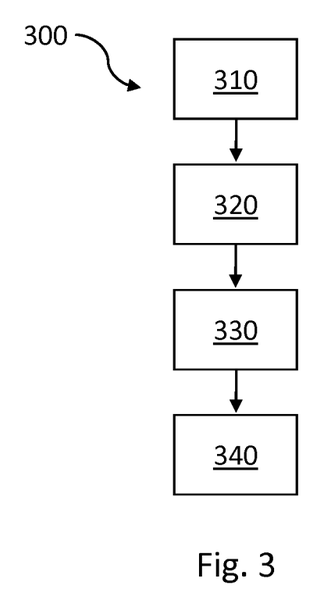
FIG. 3 is a flow diagram showing an example of another method according an embodiment of the present invention.

FIG. 3 is a flow diagram showing an example of another method according an embodiment of the present invention. Again, the method 300 may be performed by a landing gear system controller 120, such as the landing gear system controller 120 of any one of the embodiments discussed herein.

The method 300 of this embodiment comprises receiving 310 a request to operate a non-landing gear system element of the aircraft. The request may, for example, be electrical or electronic or mechanical or hydraulic, depending at least on the format of the controller 120. The request may, for example, be generated as a result of manual operation of an input device by a pilot of the aircraft. As discussed elsewhere herein, the input device may be a cockpit flight control, such as a control yoke or a control to command engagement of an automatic landing system. The request may be to operate a main control surface of the aircraft, such as any one or more of the main control surfaces discussed herein. For example, the request may be to operate a main control surface of the aircraft, such as an elevator, to cause rotation of the aircraft during a take-off procedure. Alternatively, the request may be for something else, such as a request to commence an automatic aircraft landing procedure.

The method also comprises causing or initiating 320 operation of at least part of the landing gear system of the aircraft during a take-off or landing procedure on the basis of the request. The at least part of the landing gear system may comprise one or more of: a landing gear bay door lock, a landing gear bay door actuator, a landing gear lock, and a landing gear actuator, for example. The causing 320 operation of at least part of the landing gear system may, for example, be on the basis of the request and in dependence on a determination that at least one predetermined condition is true. As discussed elsewhere herein, the at least one predetermined condition may be selected from the group consisting of: (a) that a predetermined period has elapsed since the controller 120 received the request, (b) that the request meets a predetermined criterion, (c) that the aircraft has rotated, (d) that the aircraft is off the ground, (e) that the aircraft is achieving a positive rate of climb, (f) that the aircraft is travelling at greater than a predetermined speed, (g) that the aircraft is at greater than a predetermined height above the ground, (h) that the aircraft is travelling at less than a predetermined speed, and (i) that the aircraft is at less than a predetermined height above the ground.

Although not essential to every embodiment, the method 300 of this embodiment further comprises causing 330 operation of a secondary control surface actuator of the aircraft to drive movement of a secondary control surface of the aircraft on the basis of the request. The secondary control surface may comprise a flap or a slat, such as on a wing of the aircraft. The causing operation of the secondary control surface actuator may, for example, be in dependence on a status of the landing gear system, such as a degree of extension or retraction of a landing gear of the landing gear system.

Although not essential to every embodiment, the method 300 of this embodiment further comprises causing 340 operation of the non-landing gear system element of the aircraft on the basis of the request. The element may, for example, be selected from the group consisting of: a main control surface, an aileron, an elevator, a rudder, a secondary control surface, a flap, a slat, a thrust generator, and an automatic landing system.

In the above-described embodiments, operation of at least part of a landing gear system of an aircraft during a take-off or landing procedure is caused or initiated on the basis of a (singular) request. In some other embodiments, more than one request to operate a non-landing gear system element of the aircraft may be received, and operation of at least part of the landing gear system during a take-off or landing procedure may be caused or initiated on the basis of each respective request. For example, the controller may be configured to cause operation of a landing gear bay door actuator to drive movement of the landing gear bay door from a closed position towards an open position on the basis of a first request, and to cause operation of a landing gear actuator to drive movement of the landing gear between a retracted position and an extended position on the basis of a second request. In still further embodiments, the controller may be configured to cause operation of the landing gear bay door actuator to drive movement of the landing gear bay door from the open position towards the closed position on the basis of a third request.

Figure 4:
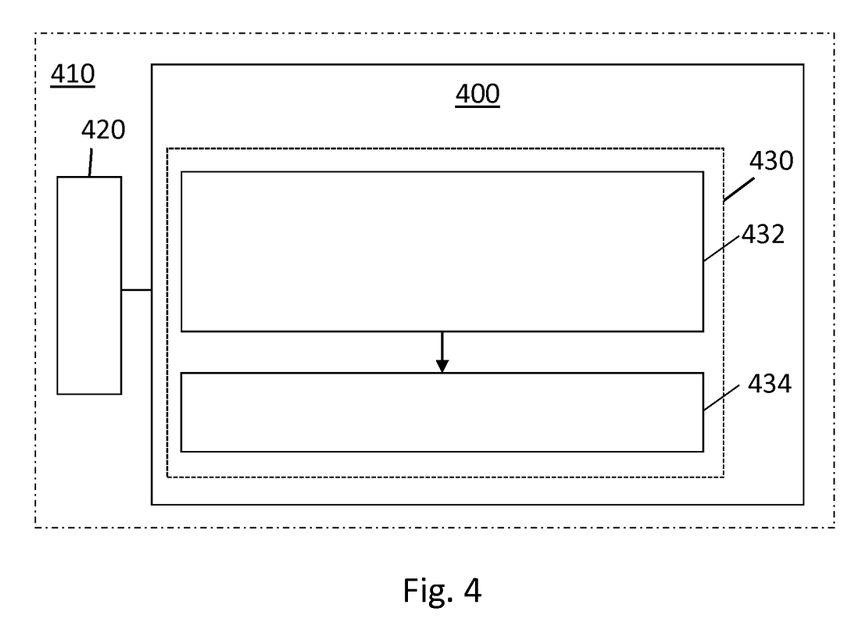
FIG. 4 is a schematic diagram of an example of a non-transitory computer-readable storage medium according an embodiment of the present invention.

FIG. 4 shows a schematic diagram of a non-transitory computer-readable storage medium 400 according to an embodiment of the present invention. The non-transitory computer-readable storage medium 400 stores instructions 430 that, if executed by a processor 420 of a landing gear system controller 410, cause the processor 420 to perform a method according to an embodiment of the present invention. In some embodiments, the controller 410 is the landing gear system controller 120 described above with reference to FIG. 1 or a variant thereof described herein. The instructions 430 comprise: receiving 432 a request to operate a non-landing gear system element of the aircraft, and causing or initiating 434 operation of at least part of the landing gear system of the aircraft during a take-off or landing procedure on the basis of the request. The instructions 430 may comprise instructions to perform the one of the methods 200, 300 described above with reference to FIG. 2 or FIG. 3, respectively.

Figure 5:
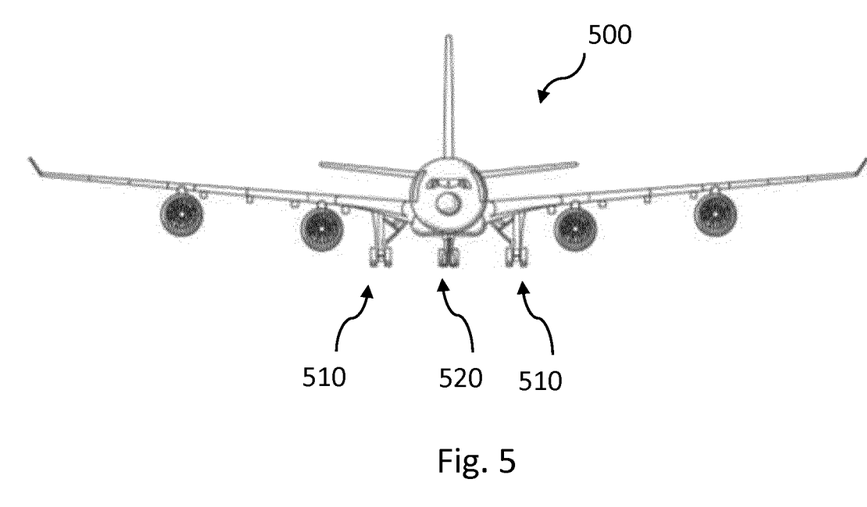
FIG. 5 is a schematic front view of an example of an aircraft according to an embodiment of the present invention.

FIG. 5 shows a schematic diagram of an aircraft 500 in accordance with an embodiment of the present invention. In this embodiment, the aircraft 500 comprises two main landing gears 510 and a nose landing gear 520. The aircraft 500 also comprises the non-transitory computer-readable storage medium 400 (not shown) discussed above with reference to FIG. 4. The aircraft 500 also comprises the aircraft system 100 (not shown) discussed above with reference to FIG. 1. In some embodiments, the aircraft system 100 is common to all of the landing gears 510, 520. In other embodiments, the aircraft 500 has a plurality of such aircraft systems 100, such as one aircraft system 100 for each of the landing gears 510, 520.

It is to noted that the term "or" as used herein is to be interpreted to mean "and/or", unless expressly stated otherwise.

The above embodiments are to be understood as non-limiting illustrative examples of how the present invention, and aspects of the present invention, may be implemented. Further examples of the present invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present invention, which is defined in the accompanying claims.

The invention claimed is:

1. A landing gear system controller for controlling a landing gear system of an aircraft, wherein the landing gear system controller is configured:
   to receive a request, during takeoff of the aircraft, to operate a non-landing gear system element of the aircraft;
   to perform a determination in response to the request as to whether to cause an operation of at least part of the landing gear system of the aircraft during the takeoff, and
   causing the operation to occur based on the determination.

2. The landing gear system controller of claim 1, wherein the request comprises a request to operate a main control surface of the aircraft to cause rotation of the aircraft during the take-off procedure.

3. An aircraft system, comprising:
   a landing gear system; and
   the landing gear system controller according to claim 1.

4. The aircraft system of claim 3, wherein the landing gear system controller is configured to cause the operation of at least part of the landing gear system in response to the request and in dependence on a determination that at least one predetermined condition is true.

5. The aircraft system of claim 4, wherein the at least one predetermined condition is selected from the group consisting of:
   that a predetermined period has elapsed since the landing gear system controller received the request,
   that the request meets a predetermined criterion,
   that the aircraft has rotated,
   that the aircraft is off the ground,
   that the aircraft is achieving a positive rate of climb,
   that the aircraft is travelling at greater than a predetermined speed,
   that the aircraft is at greater than a predetermined height above the ground,
   that the aircraft is travelling at less than a predetermined speed, and
   that the aircraft is at less than a predetermined height above the ground.

6. The aircraft system of claim 3, wherein landing gear system comprises a landing gear that is moveable between an extended position and a retracted position, and a landing gear actuator for driving movement of the landing gear between the extended position and the retracted position; and
   wherein the at least part of the landing gear system comprises the landing gear actuator to drive movement of the landing gear between the extended position and the retracted position.

7. The aircraft system of claim 3, wherein the landing gear system comprises:
   a landing gear that is moveable between an extended position and a retracted position, wherein the landing gear is at least partially stowed in a landing gear bay when the landing gear is at the retracted position,
   a landing gear bay door that is movable between a closed position and an open position, wherein the landing gear bay door at least partially covers the landing gear bay when the landing gear bay door is at the closed position, and
   a landing gear bay door actuator for driving movement of the landing gear bay door between the closed position and the open position; and
   wherein the at least part of the landing gear system comprises the landing gear bay door actuator to drive movement of the landing gear bay door between the closed position and the open position.

8. The aircraft system of claim 3, further comprising a secondary control surface and a secondary control surface actuator for driving movement of the secondary control surface;
   wherein the landing gear system controller is further configured to cause operation of the secondary control surface actuator to drive movement of the secondary control surface on the basis of the request.

9. The aircraft system of claim 8, wherein the landing gear system controller is further configured to determine a status of the landing gear system, and to cause the operation of the secondary control surface actuator to drive movement of the secondary control surface on the basis of the request and in dependence on the status determined.

10. The aircraft system of claim 9, wherein the status of the landing gear system comprises a degree of extension or retraction of a landing gear of the landing gear system.

11. The aircraft system of claim 3, further comprising the non-landing gear system element, wherein the landing gear system controller is further configured to cause operation of the non-landing gear system element on the basis of the request.

12. The aircraft system of claim 3, further comprising an input device that is operatively connected to the landing gear system controller, wherein the input device is manually operable by a pilot of the aircraft to generate the request.

13. An aircraft, comprising the landing gear system controller of claim 1.

14. A method of controlling a landing gear system of an aircraft during take-off of the aircraft, the method comprising:
- during takeoff of the aircraft, receiving a request to operate a non-landing gear system element of the aircraft,
- in response to the request, determining based on the request whether to cause operation of at least part of the landing gear system of the aircraft during the takeoff, and
- performing the operation based on the determination.

15. A non-transitory computer-readable storage medium storing instructions that, if executed by a processor of a landing gear system controller, cause the processor to carry out the method of claim 14.

16. An aircraft landing gear system controller in an aircraft, wherein the landing gear system controller is configured to:
- during takeoff of the aircraft, receive a request to from a pilot operate a non-landing system element of the aircraft;
- in response to the request, determine whether to initiate operation of an element of a landing gear system of the aircraft, and
- in response to the determination, causing the operation to occur.

* * * * *